(12) United States Patent
Meggiolan

(10) Patent No.: US 7,137,639 B2
(45) Date of Patent: Nov. 21, 2006

(54) METHOD FOR PRODUCING A CONNECTOR ELEMENT FOR CONNECTING FRAME PARTS AT A JOINT LOCATION IN A BICYCLE FRAMEWORK AND CONNECTOR ELEMENT OBTAINED THEREBY

(75) Inventor: Mario Meggiolan, Creazzo (IT)

(73) Assignee: Campagnolo S.r.l., Vicenza (IT)

( * ) Notice: Subject to any disclaimer, the term of this patent is extended or adjusted under 35 U.S.C. 154(b) by 107 days.

(21) Appl. No.: 10/844,624

(22) Filed: May 13, 2004

(65) Prior Publication Data

US 2004/0207172 A1    Oct. 21, 2004

Related U.S. Application Data

(62) Division of application No. 10/073,407, filed on Feb. 13, 2002, now Pat. No. 6,803,007.

(30) Foreign Application Priority Data

Feb. 13, 2001    (IT)    ............ TO2001A0120

(51) Int. Cl.
*B62K 1/00* (2006.01)
(52) U.S. Cl. .............. 280/281.1; 264/258; 264/313
(58) Field of Classification Search ........... 280/288.2, 280/288.3, 274, 281.1; 264/258, 313
See application file for complete search history.

(56) References Cited

U.S. PATENT DOCUMENTS

| | | | |
|---|---|---|---|
| 4,038,490 A | 7/1977 | Miller et al. | |
| 4,145,068 A * | 3/1979 | Toyomasu et al. | 280/281.1 |
| 4,361,533 A | 11/1982 | Jenks et al. | |
| 4,479,662 A * | 10/1984 | Defour et al. | 280/281.1 |
| 4,583,755 A * | 4/1986 | Diekman et al. | 280/281.1 |
| 4,683,099 A | 7/1987 | Buxton et al. | |
| 4,900,049 A * | 2/1990 | Tseng | 280/281.1 |
| 5,084,219 A | 1/1992 | Sigur | |
| 5,266,137 A | 11/1993 | Hollingsworth | |
| 5,534,203 A | 7/1996 | Nelson et al. | |
| 6,290,889 B1 | 9/2001 | Castanie et al. | |
| 6,340,509 B1 | 1/2002 | Nelson et al. | |
| 6,742,796 B1 * | 6/2004 | Ho et al. | 280/281.1 |

FOREIGN PATENT DOCUMENTS

| | | |
|---|---|---|
| EP | 0 685 386 A1 | 6/1995 |
| EP | 0 829 421 A2 | 3/1998 |
| ES | 2 021 998 | 11/1991 |
| WO | 98/54046 | 3/1998 |

* cited by examiner

*Primary Examiner*—Tony H. Winner
(74) *Attorney, Agent, or Firm*—Volpe and Koenig, P.C.

(57) ABSTRACT

A connector element for connecting frame parts at a joint location in a bicycle frame is made of a single part of structural fiber based material, typically carbon fiber material, after reticulation in a mold exploiting the expansion of a core on which windings of fiber fabric material are provided, to obtain the application of a uniform radial pressure on the layers of fiber based material. In one embodiment, the connector element defines a bicycle bottom bracket and tubular extensions extending therefrom for connection to elements of the bicycle frame.

7 Claims, 4 Drawing Sheets

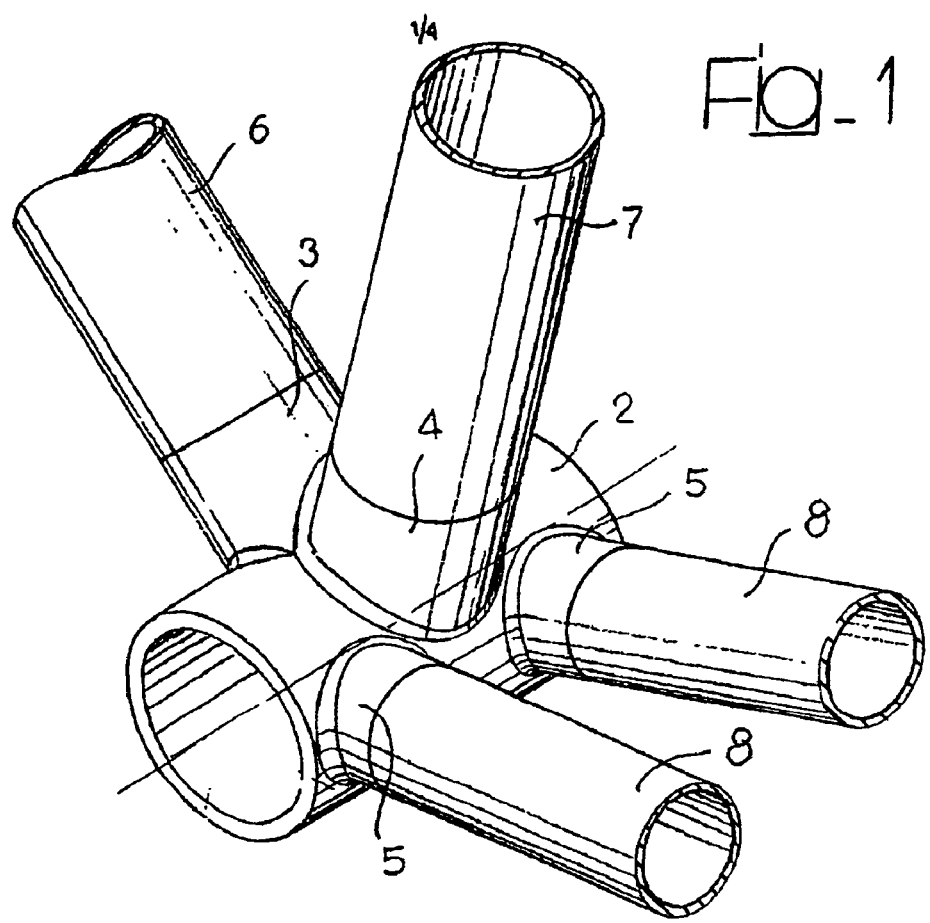
Fig_1
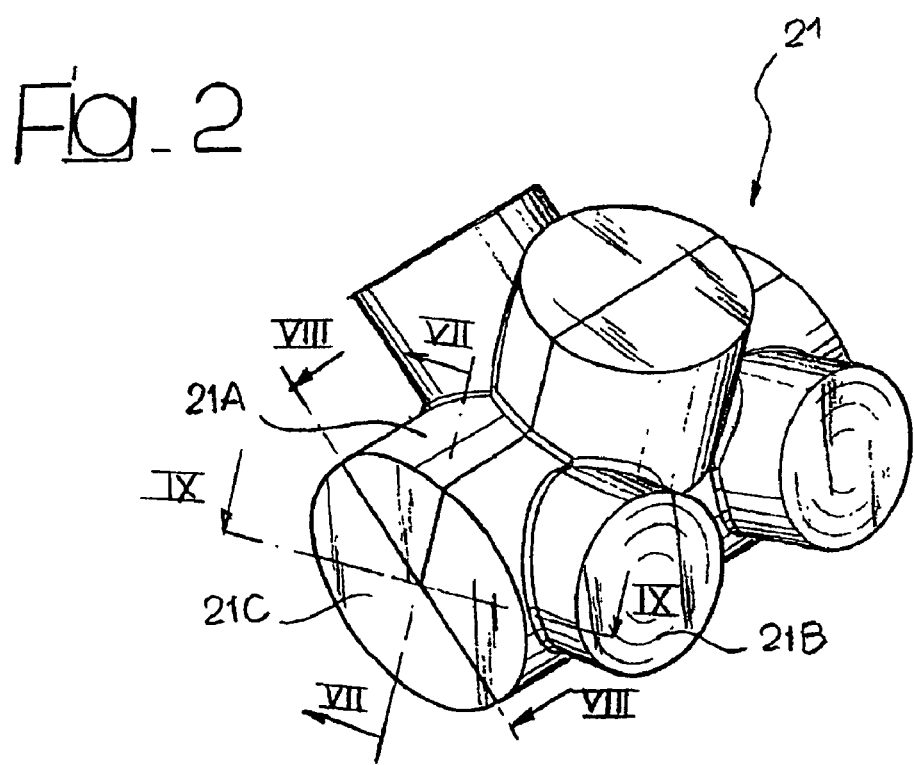
Fig_2

Fig_3
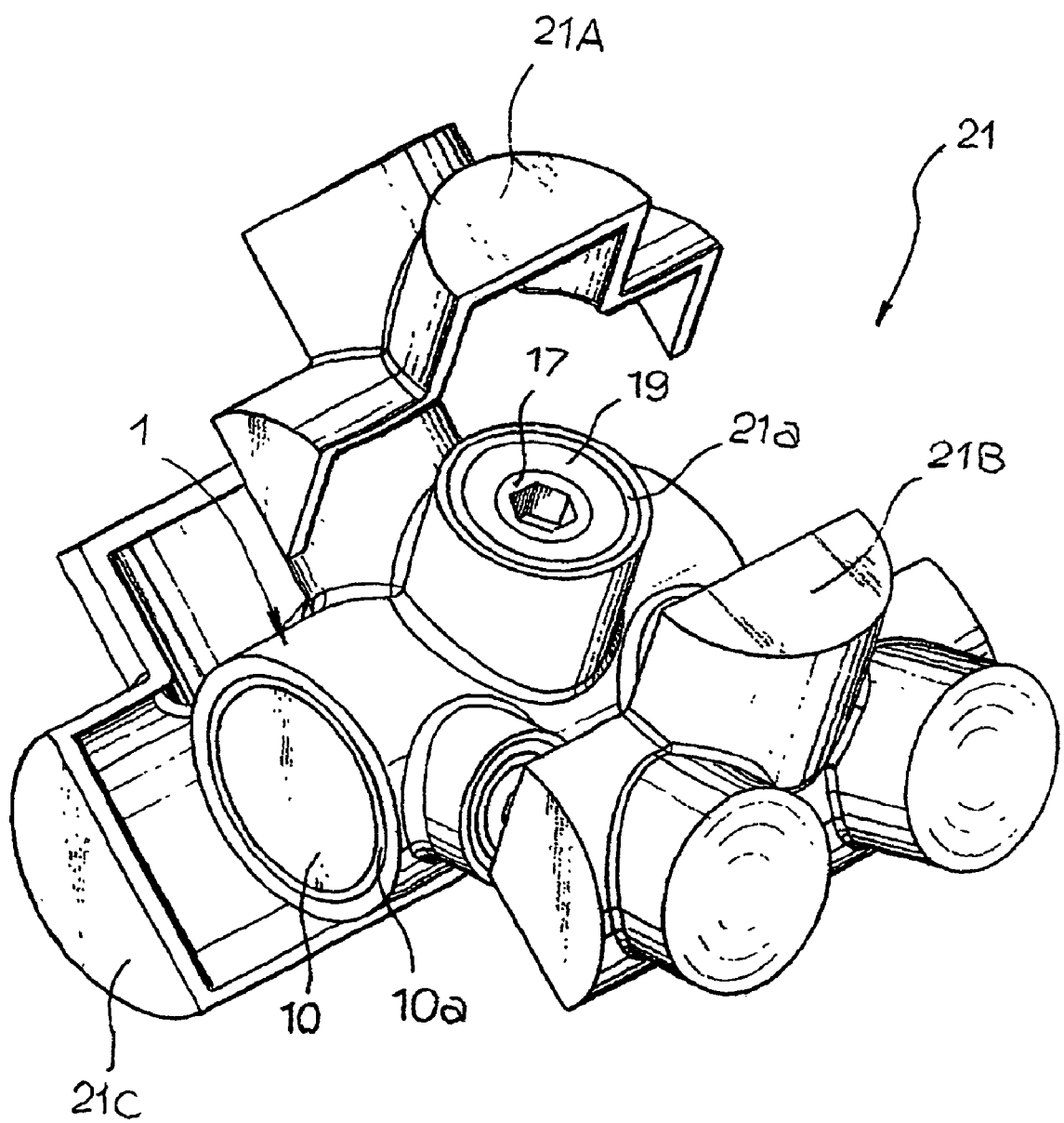

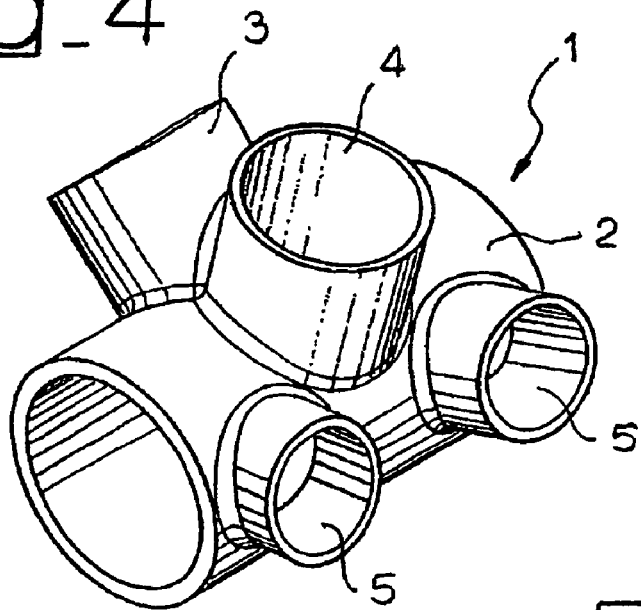
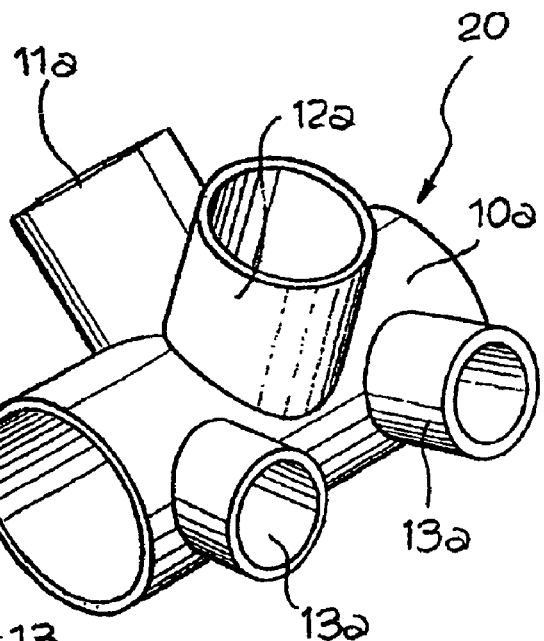
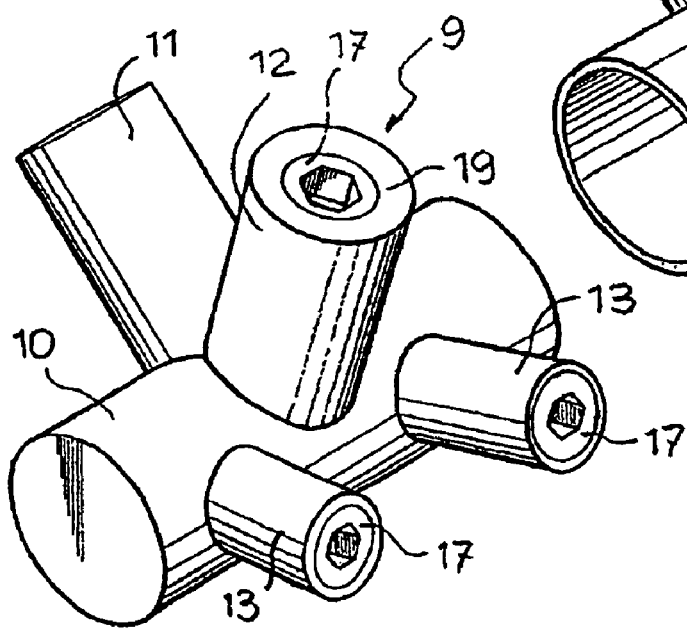

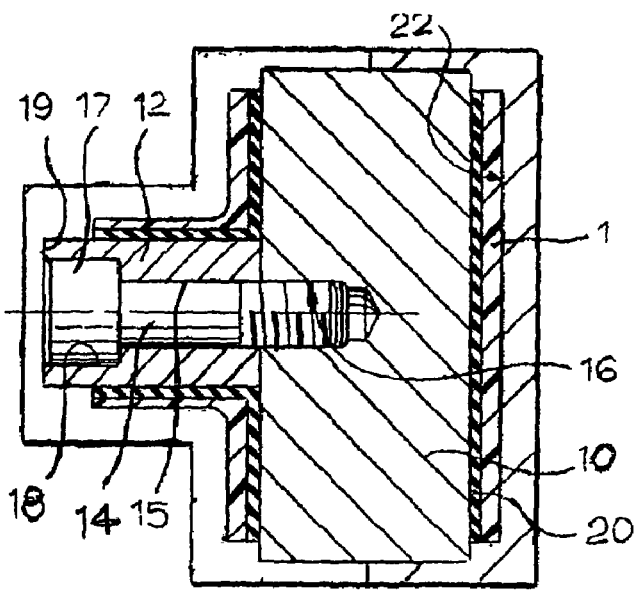
Fig_7
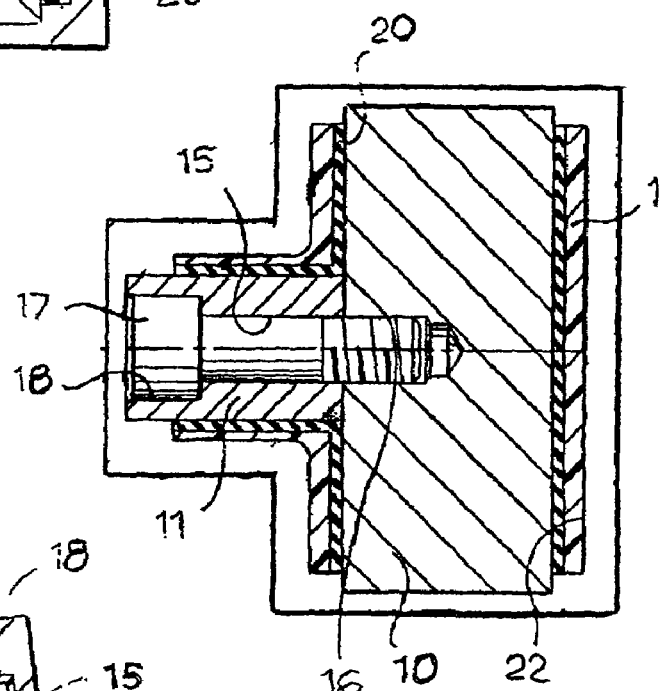
Fig_8
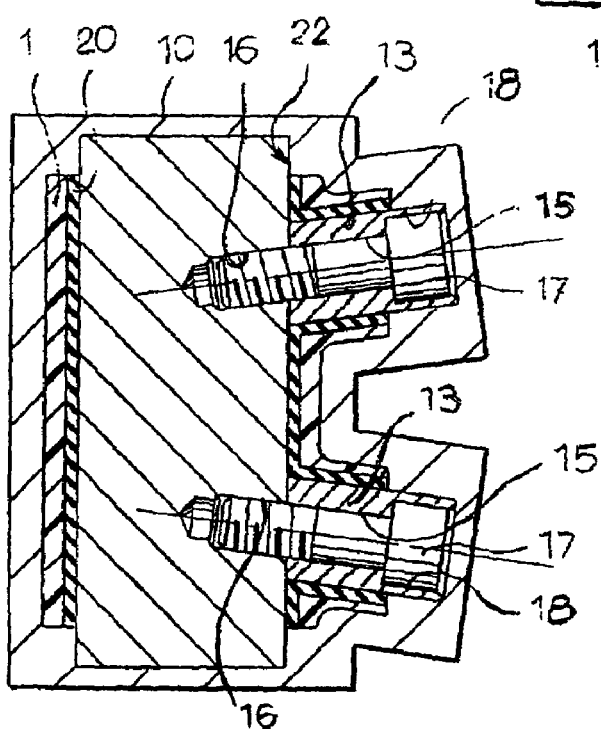
Fig_9

METHOD FOR PRODUCING A CONNECTOR ELEMENT FOR CONNECTING FRAME PARTS AT A JOINT LOCATION IN A BICYCLE FRAMEWORK AND CONNECTOR ELEMENT OBTAINED THEREBY

CROSS REFERENCE TO RELATED APPLICATION(S)

This application is a division of U.S. patent application Ser. No. 10/073,407 filed Feb. 13, 2002 now U.S. Pat. No. 6,803,007, which is incorporated by reference as if fully set forth.

FIELD OF INVENTION

The present invention relates to a method for producing a connector element for connecting frame parts at a joint location in a bicycle framework, and a connector element obtained thereby. The invention is further related to a bicycle bottom bracket obtained by this method.

BACKGROUND

Structural fiber fabrics incorporated in a plastic material matrix are known and have been used for some time. They are made with yarn obtained from structural fibers, such as carbon fibers, for example. These fabrics are then subjected to a calendering process to associate them to a plastic material matrix, typically a thermosetting plastic material.

The Applicant has recently conducted various studies and tests to make bicycle components, such as wheel hubs or bottom brackets for housing the bicycle crank axle, using structural fiber based material, typically carbon fiber based material. The advantage offered by this type of material is that it is lightweight with respect to the metal materials commonly used, given equal structural characteristics. Making such a component out of a single part of carbon fiber based material, however, proved to be difficult heretofore, due to the complex conformation of such components.

The object of this invention is to overcome this technical problem.

SUMMARY

In order to attain this object, the present invention provides a method for producing a connector element for connecting frame parts at a joint location in a bicycle framework,
characterized in that it comprises the following steps:
arranging an expandable core,
applying a number of layers of structural fiber fabric incorporated in a plastic material matrix around the core, to form a layered body, of predetermined shape and thickness,
arranging the core with the layered body in the cavity of a mold,
increasing the temperature of the mold (21) to a value sufficient to cause the reticulation of the plastic material matrix,
expanding the core so as to apply a pressure on the body inside the mold,
removing the body from the mold and removing the core from the body, so as to obtain a hollow body formed of a single piece of structural fiber based material.

In the preferred embodiment of the method according to this invention, a plurality of fabric layers of the type described above are wrapped around a core defined by a metal body with a sheath of expandable plastic material. In so doing, the material conforms to the shape of the body. When the mold is heated to reticulate the thermosetting matrix of the layered tubular body wrapped around the core, the material forming the sheath dilates, and applies a radial pressure on the walls of the hollow body, which is beneficial to obtain a product with the necessary structural characteristics. The fundamental advantage of the thermally dilating sheath is that it allows uniform application of such pressure, despite the possibly complex conformation of the preformed body.

In the preferred embodiment of this invention, said structural fibers are carbon fibers and the plastic material matrix is a thermosetting plastic material matrix. The mold temperature needed to complete the process is preferably in the range from 80° C. to 200° C. The mold is preferably maintained at a temperature in this range for 10 minutes to three hours, and preferably from 30 minutes to three hours.

This invention also relates to a connector element for connecting frame parts at a joint location in a bicycle framework. In the preferred embodiment, the method makes a bicycle bottom bracket, which is the part of the bicycle frame that houses the bicycle crank axle. The bracket has integrated tubular extensions for connecting the down tube and the seat tube of the bicycle frames that converge into the bottom bracket.

The method may be also applied for obtaining a connector element to be used at any other different location of the bicycle frame where two or more frame parts converge into each other, such as at the intersections of the frame head tube with the top tube and the down tube or at the intersections of the seat tube with the top tube or the elements of the bicycle upper rear fork.

Another aspect of the invention is directed to a connector element for connecting frame parts at a joint location in a bicycle framework, comprising a single piece made of structural fiber based material, preferably carbon fiber material, incorporating a main tubular portion and one or more tubular branches departing from the main portion, which are to be connected to tubular elements of the bicycle frame.

Naturally, once the method is completed, the body thus obtained can be subjected to additional machining, to make a finished product ready for use.

BRIEF DESCRIPTION OF THE DRAWING(S)

This invention will be better explained by the following detailed descriptions with reference to the accompanying Figures as non-limiting examples.

FIG. 1 is a perspective view of a bicycle bottom bracket, which can be made with the method according to this invention, shown mounted to in a bicycle frame.

FIG. 2 is a perspective view of the closed mold used for obtaining the bottom bracket of FIG. 1.

FIG. 3 is a perspective view of the opened mold in FIG. 2 at the final stage of the method.

FIG. 4 is a perspective view of the bottom bracket, obtained at the end of the method FIG. 5 is a perspective view of the elastomeric material sheath used in the method.

FIG. 6 is a perspective view of the metal body used in the method.

FIGS. 7, 8, 9 are cross-sectional views taken along lines VII—VII, VIII—VIII and IX—IX in FIG. 2.

DETAILED DESCRIPTION OF THE PREFERRED EMBODIMENTS

FIG. 4 shows a bicycle bottom bracket that can be obtained with the method according to this invention, comprises a single integral body made of structure fiber based material, typically carbon fiber material, but the structural fibers can be selected among carbon fibers, glass fibers, Kevlar fibers, or any combinations thereof. The bottom bracket 1 comprises a main cylindrical tubular portion 2 that receives the crank axle of the bicycle, and four extensions, or tubular branches, 3, 4, 5, extending from the main portion 2 along substantially radial directions.

FIG. 1 shows the component 1 assembled on the bicycle frame, in which the auxiliary branches 3, 4, 5 are to be connected (for example, glued) to other tubular elements of the bicycle frame, specifically the down tube 6 of the frame, the seat tube 7, and the two branches 8 of the rear fork of a bicycle.

In this presently preferred embodiment, in order to obtain the body 1, a metal body of corresponding shape is arranged as shown in the perspective view in FIG. 6. The metal body 9 comprises a main cylindrical portion 10 that forms the main portion 2 of the bottom bracket 1, as well as a plurality of auxiliary branches 11, 12, 13 each being cylindrical in shape, each extending from the main portion 10 in radial directions. The main portion 2 and/or one or more of the plurality of auxiliary branches 11, 12, 13 can also have an elliptical or other shapes. Further, the auxiliary branches 11, 12, 13 can extend from the main portion 2 in non radial directions.

The various elements forming the metal body 9 are connected together using screws 14 (see FIGS. 7–9) and thus, can be easily separated. Each screw 14 crosses an axial through hole of a respective auxiliary branch 11, 12 or 13 of the metal body 9 and is engaged in a closed-back threaded hole 16 in the main portion 10 of the metal body. The head 17 of each fastening screw 14 is received in a cavity 18 made in the end surface 19 of the respective branch 11, 12, or 13 of the metal body. In this way, the upper surface of the head 17 of each screw is on the same level as the external surface 19 of the respective core branch. Each head 17 presents a hexagonal recess for engaging a tool. Due to the arrangement described above, the metal body 9 can be easily assembled and disassembled, as additionally described below.

For the purpose of making the body 1, the metal body 9 is covered with an elastomeric material sheath 20 (see FIG. 5), the shape of which essentially corresponds to that of the inner surface of the product to be obtained. The sheath is fitted upon the various elements of the metal body with a slight interference, for which the elastic return of the material forming the sheath ensures the connection of the sheath with the metal body 9. That the metal body 9 can be disassembled facilitates covering the metal body with the sheath, since each of the elements forming the metal body 9 can be introduced separately in the respective cavity in the sheath and can then be joined with the other components of the metal body. With reference to FIG. 5, the sheath 20 presents a main tubular portion 10a destined to cover the main portion 10 of the metal body and auxiliary tubular branches 11a, 12a, 13a destined to cover the branches 11, 12, 13 of the metal body.

A layer of structural fiber base fabric (typically carbon fiber fabric) incorporated in a thermosetting plastic material matrix is arranged on the core formed by the metal body 9 and the sheath applied on it. In practice, the layers are made by continuously wrapping a strip of fabric around the main portion of the sheath and around the various auxiliary branches, similar to an orthopedic bandaging on a human limb. Preferably, the layers are completed with a number of plies each presenting a central opening, which are applied around the various auxiliary branches of the core coated with the sheath, in the area in which the branches depart from the main portion of the core each passing through the hole of the respective ply. Said layers are applied to obtain a layered hollow body 1 (shown in FIGS. 7–9) of the required dimensions and proportions.

The assembly formed by the core 9, 20 and the layered hollow body 1 formed over the core is arranged in the cylindrical cavity 21 of a mold formed by three casings 21a, 21b, 21c shown in FIGS. 2 and 3. The shape of the mold corresponds to that of the product to be obtained and, consequently, defines a main cylindrical portion from which four radially directed auxiliary branches extend. For the sake of simplicity, the drawings do not show the connection means between the three casings of the mold 21. These means can be made in any known way.

After positioning the assembly formed by the core 9,20 and the layered body 1 formed on the core in the mold, the mold is taken to a temperature sufficient to cause the reticulation of the thermosetting plastic material matrix belonging to the body 1, for example to a temperature comprised between 80° C. and 200° C. This temperature increase is maintained for a time comprised in the range from 10 minutes to 3 hours, preferably from 30 minutes to three hours. In this way, the material forming the sheath 20 dilates. This dilation is mainly impressed radially outwards, by which a radial pressure is exerted outwards against the walls of all the tubular parts of the body 1, which is thus pushed against the wall of the cylindrical cavity 21. In this way, a uniform pressure is applied on all the parts of the hollow body 1, despite the complex conformation of the body illustrated herein. In the meantime, the plastic material matrix is subjected to reticulation.

After a cooling stage, the mold is opened and the assembly comprising the core 9, 20 and the molded body 1 is extracted at the end of the reticulation phase. At this point, the elements 11, 12, 13 and 10 forming the metal body 9 are extracted from the assembly after removing the connecting screws by engaging a tool in the recesses of the heads 17 of the screws. When the metal body is removed, the elastomeric sheath 20 remains inside the carbon fiber hollow body. At this point, the sheath can be easily removed from inside the hollow body, due to its elasticity. FIG. 4 shows the body 1 thus obtained. This body can be subjected to additional machining in order to obtain the finished product ready for use that is connected to the tubular elements of the bicycle frame in the way shown in FIG. 1.

As mentioned above, the elastomeric material forming the sheath 20 is preferably a material with a thermal dilation coefficient exceeding 15×10−5 mm/° C. and a maximum continuous heat resistance temperature exceeding 100° C. For example, said material forming the sheath 20 can be a synthetic rubber of the type marketed under the trademark AIRCAST 3700 by Airtech International Inc., Huntington Beach, Calif., USA. This material is preferred for its relatively high thermal dilation coefficient, as well as its high continuous heat resistance, for its good thermal conductivity and for its good ultimate tensile stress, as described above in detail.

Naturally, while the principle of the invention remains the same, the embodiments and the details of construction may widely vary without departing from the scope of the invention.

For example, the winding stage of fiber fabric may be completed with one or more additional strips wound around the ends of one or more portions of the expandable core in order to provide enlarged diameter and increased thickness at selected locations.

In a different embodiment, the expandable core may be provided in the form defined in claims 24–28. Thus, in place of the metal body 9 with the associated sheath 20, a body of expandable material, typically PTFE, can be used. This body may be made of separate pieces removably connected to each other to render extraction thereof from the finished product possible.

In another different embodiment, the expandable core includes a body of metal material including a number of separate sectors and the expansion of the core is obtained through a radially outward movement of these sectors.

As also indicated in the initial portion of this description, the connector element of the invention is shown in form of a bicycle bottom bracket, but can also be made in form of a connector element for any other joint location of the bicycle frame, such as at the intersections of the frame head tube with the top tube and the down tube or at the intersections of the seat tube with the top tube or with the elements of the bicycle upper rear fork.

What is claimed is:

1. A method of forming a connector element for a bicycle frame comprising the following steps:

arranging an expandable core, the core having a main cylindrical portion and one or more branches extending from the main portion, the branches being removably connected to the core by means of screws, applying a number of layers of structural fiber fabric incorporated in a plastic material matrix around the core, to form a layered body, of predetermined shape and thickness, arranging the core with the layered body in the cavity of a mold, increasing the temperature of the mold to a value sufficient to cause reticulation of the plastic material matrix, expanding the core, so as to apply a pressure on the body inside the mold, the expansion of the core being obtained through the dilation of the plastic material matrix, removing the body from the mold and removing the core from the body, so as to obtain a hollow body formed of a single piece of structural fiber based material.

2. The method of claim 1 wherein the connector element formed defines a bicycle bottom bracket with associated tubular extensions for connection to bicycle frame tubes converging towards the bottom bracket.

3. The method of claim 2 wherein the body formed presents a main tubular cylindrical portion, defining the bottom bracket of the bicycle, and a plurality of tubular branches extending from the main portion, and the branches are configured to be connected to the tubular elements of the bicycle frame converging towards the bottom bracket.

4. The method of claim 1 wherein the connector element formed is designed for connection of bicycle frame tubes at a joint location of a bicycle frame where the frame tubes converge towards each other.

5. The method of claim 4 wherein the body formed presents a main tubular cylindrical portion and one or more tubular branches that extend from the main portion that are configured to be connected to tubular elements of the bicycle frame.

6. The method of claim 5 wherein at least one of said main portion and said branches has diameter and/or thickness that varies along a length thereof.

7. A method of forming a connector for parts of a bicycle framework comprising the following steps:

a) providing an expandable core of a predetermined shape, the core having a main cylindrical portion and one or more branches extending from the main portion, the branches being removably connected to the core by means of screws, b) applying multiple layers of structural fiber fabric incorporated in a plastic material matrix around the core to form a layered body of a predetermined thickness, c) arranging the product of step b) in a mold having a cavity that generally conforms to the predetermined shape of the core, d) increasing the temperature of the mould to a value sufficient to cause reticulation of the plastic material matrix, e) expanding the core sufficiently to press the body against inside of the mold cavity, f) removing the body from the mold, and g) removing the expandable core from the body to obtain a connector formed of a single piece of structural fiber based material.

\* \* \* \* \*